United States Patent [19]

Shiban et al.

[11] Patent Number: 6,084,148
[45] Date of Patent: Jul. 4, 2000

[54] METHOD FOR REACTING PYROPHORIC GAS

[75] Inventors: Samir S. Shiban, Beaverton; Daniel G. Morgan, Tigard, both of Oreg.

[73] Assignee: Intel Corporation, Santa Clara, Calif.

[21] Appl. No.: 08/109,166

[22] Filed: Aug. 19, 1993

Related U.S. Application Data

[62] Division of application No. 07/864,673, Apr. 7, 1992, Pat. No. 5,271,908.

[51] Int. Cl.[7] .................................................... B01D 53/34
[52] U.S. Cl. ................................................ 588/202; 423/210
[58] Field of Search ................................ 423/210; 588/202

[56] References Cited

U.S. PATENT DOCUMENTS

| | | | |
|---|---|---|---|
| 3,093,626 | 6/1963 | Clines | 526/65 |
| 3,112,988 | 12/1963 | Coldren et al. | 23/293 R |
| 3,256,357 | 6/1966 | Baumann et al. | 585/401 |
| 3,607,104 | 9/1971 | Blickle et al. | 422/141 |
| 3,867,102 | 2/1975 | Csathy | 423/210 |
| 3,880,594 | 4/1975 | Shaw | 423/210 |
| 3,919,389 | 11/1975 | Jonescu | 423/210 |
| 4,152,399 | 5/1979 | Germerdonk et al. | 423/210 |
| 4,355,010 | 10/1982 | Jodden et al. | 423/210 |
| 4,535,072 | 8/1985 | Kitayama et al. | 423/210 |
| 4,555,389 | 11/1985 | Soneta et al. | 423/210 |
| 4,608,062 | 8/1986 | Hughes | 96/190 |
| 4,801,437 | 1/1989 | Konagaya et al. | 423/210 |
| 4,816,237 | 3/1989 | Tomomura et al. | 423/210 |
| 5,133,941 | 7/1992 | Hays et al. | 422/140 |
| 5,169,605 | 12/1992 | Carpentier | 422/182 |

OTHER PUBLICATIONS

Lawrence G. Britton, "Combustion Hazards Of Silane And Its Chlorides", Central Research and Engineering Technology Department, Union Carbide Corp. P.O. Box 8361 South Charleston, W.Va. 25303, 1989, pp. 1–43, (No Month).

*Primary Examiner*—Tom Dunn
*Assistant Examiner*—Stuart L. Hendrickson
*Attorney, Agent, or Firm*—Blakely, Sokoloff, Taylor & Zafman LLP

[57] ABSTRACT

A method for reacting a pyrophoric gas is disclosed. In the method, a stream of spent process gas from, for example, a chemical vapor deposition process containing silane is mixed with the oxidizing gas flow such as air. The combined flow is sufficiently turbulent to provide for a controlled reaction of the silane. The method may be used for a wide range of pyrophoric gas flow rates, such that the risk of explosion is eliminated. The reaction between silane and oxygen occurs spontaneously. Because the reaction proceeds spontaneously, no ignitor is necessary. Additionally, the method requires no external fuel source and, due to the turbulence proceeds even in conditions were no flame is generated.

10 Claims, 4 Drawing Sheets

METHOD FOR REACTING PYROPHORIC GAS

This is a divisional of application Ser. No. 07/864,673, filed Apr. 7, 1992, now U.S. Pat. No. 5,271,908.

BACKGROUND OF THE INVENTION

1. Field of the Invention

The present invention relates to a method and apparatus for neutralizing pyrophoric gases. The invention can be used to neutralize, for example, pyrophoric gases used in the manufacture of semiconductor devices.

2. Prior Art

Many industries use pyrophoric gases for a variety of processes and operations. In the semiconductor industry, a variety of pyrophoric gases are used during the manufacture of semiconductor devices. These gases are termed pyrophoric due to their ability to ignite spontaneously upon contact with an oxidant such as oxygen. Thus, these gases may ignite upon contact with air, and if a pocket of pyrophoric gas contacts air, an explosion may result. The possibility of explosion is increased by the tendency of some pyrophoric gases to "self protect", wherein bubbles or pockets of the pyrophoric gas develop which prevents reaction or neutralization of the pyrophoric gas in a controlled manner.

Pyrophoric gases are usually used for the deposition of various layers or for introducing dopants into the various layers of a semiconductor device. For example, silane ($SiH_4$) may be used along with oxygen to form a silicon dioxide ($SiO_2$) layer in a chemical vapor deposition (CVD) system. Diborane ($B_2H_4$), phosphine ($PH_3$), and arsine ($AsH_3$) may be used to add dopants to a layer. Silane also is used to form polycrystalline silicon layers as well as epitaxial, single crystal silicon in a variety of processes. Other commonly used pyrophoric gases include halogenated compounds such as dichlorosilane ($SiH_2Cl_2$), among others. Generally, the processes which use these pyrophorics, such as CVD deposition, utilize a flow of the reactant gases through the reactor chamber. Normally, not all of the pyrophorics are spent in the process, and any remaining pyrophorics must be exhausted or pumped out of the reactor. This spent process gas must then be neutralized in a controlled manner so that it is not released into the atmosphere where it may cause a fire or an explosion upon contact with air. In addition to spent process gas, semiconductor manufacturing operations may have other sources of pyrophoric gas which must be neutralized. For example, the pyrophoric gas pump or pipe panel may be purged with nitrogen, and the exhaust line for the pump or panel must then be neutralized.

In the prior art, several systems exist for neutralizing a gas stream containing one or more pyrophoric gases. Many of these systems are "active" in that they provide a flame and reaction chamber through which the pyrophoric, as well as flammable and/or toxic gases in the spent gas, pass. The flame ensures combustion of nearly all pyrophoric gas, thus virtually eliminating the possibility of a sufficient accumulation of the pyrophoric gas to cause an explosion. To ensure a constant flame, a fuel source, such as hydrogen ($H_2$) or natural gas ($CH_4$) is ignited by, for example, spark plugs. Example of such systems include "The Sergeant", manufactured by Custom Engineered Material, Inc. and "The Guardian", manufactured by Hoechst Celanese Corp. These systems are often referred to in the art as "burn boxes."

Another prior art system is a dilution system. In a dilution system, the gas stream containing the pyrophoric gas is first diluted in an inert gas such as nitrogen ($N_2$) in a ratio of approximately 100:1 (inert:spent process gas) by volume. This diluted gas stream is then combined with air in a reaction tube to allow the pyrophoric gas in the diluted gas stream to react with the oxygen in air. Because of the massive dilution of the spent gas stream prior to exposure to air, there is little possibility of explosion.

The aforementioned prior art systems have several drawbacks. The active systems are complex and expensive, requiring a large capital outlay. The high cost is especially significant since most facilities require several of these systems. In addition, the use of fuel such as $H_2$ or natural gas adds additional ongoing operational expenses. Also, these systems require that the fuel source, which is a flammable gas, be piped to each system installed, thereby incurring additional capital outlays and presenting an additional fire hazard. The dilution type systems, while not as complex as the active system, are expensive to operate due to the large volume of inert gas used. Also, the dilution systems will not ensure complete reaction due to possible streamlining of the pyrophoric gas in the event of a sudden release, resulting in a potential for explosion.

What is needed is a system which can efficiently neutralize pyrophoric gas. The system should ensure complete or nearly complete neutralization of any pyrophoric gas contained in the gas stream to be neutralized. It is desirable that such a system be simple and inexpensive to build and operate. It is further desirable that the system does not require a fuel source to operate. Finally, such a system should be capable of handling a spent process stream that varies in pyrophoric gas concentrations from trace amounts up to several ten of liters per minute.

SUMMARY OF THE INVENTION

A method and apparatus for neutralizing a pyrophoric gas is described. The pyrophoric gas may be contained in a stream of spent process gases from, for example, a CVD reactor in a semiconductor manufacturing facility.

A chamber is provided where the gas stream containing the pyrophoric is combined with a turbulent flow of air. The turbulent flow ensures complete mixing of the air and pyrophoric gas, thereby preventing the possibility of an explosion due to a bubble or pocket of pyrophoric gas. Also, this complete mixing ensures that all or nearly all of the pyrophoric gas is neutralized by reacting with the oxygen in the air.

The turbulent flow is provided by a plurality of 90 degree turns that the flow must take in the neutralization chamber. Also, the inlet nozzle for the air introduces turbulence into the flow. Finally, baffles or impact plates may be placed within the chamber to ensure a turbulent flow.

The disclosed invention is an inactive system in that the flame is not intentionally created and no fuel source or ignition means is used. At low concentrations of pyrophoric gas, the gas is neutralized without a flame. At high flows of pyrophoric gas, a flame often results from the spontaneous reaction of the pyrophoric gas with air.

DETAILED DESCRIPTION OF THE PREFERRED EMBODIMENT

A novel process is described for neutralizing pyrophoric gases used in the manufacture of semiconductor devices. In the following description, numerous specific details are set forth such as specific dimensions, gas flows, air flows, materials, etc. in order to provide a thorough understanding of the present invention. It will be obvious, however, to one skilled in the art, that the present invention may be practiced without these specific details. In other instances, well known methods have not been described in detail in order to avoid unnecessarily obscuring the present invention.

Figure 1:
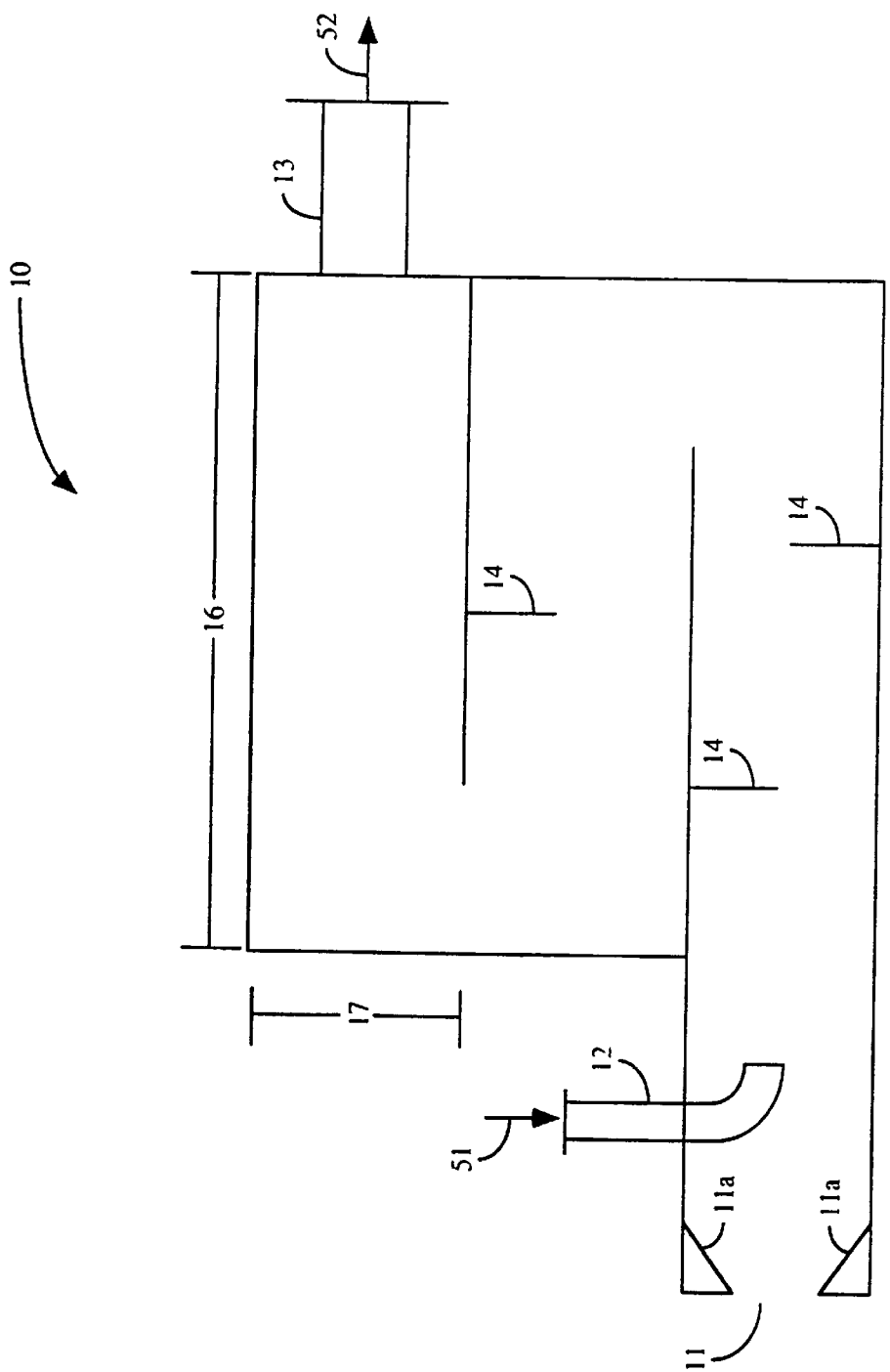
FIG. 1 is a cross-sectional elevation view of the present invention.

Referring to FIG. 1, a cross-sectional side view of the currently preferred embodiment of pyrophoric gas neutralization chamber 10 is shown. Chamber 10 includes air inlet 11, gas inlet 12, exhaust port 13, and, optionally, baffles 14. In the currently preferred embodiment, chamber 10 is a 3-tier chamber, having two 180° turns in the air flow direction. Also in the currently preferred embodiment, the length 16 of each segment is in the range of approximately 2–3 feet and, each tier is of equal height 17 which is in the range of approximately 4–6 inches.

Figure 2:
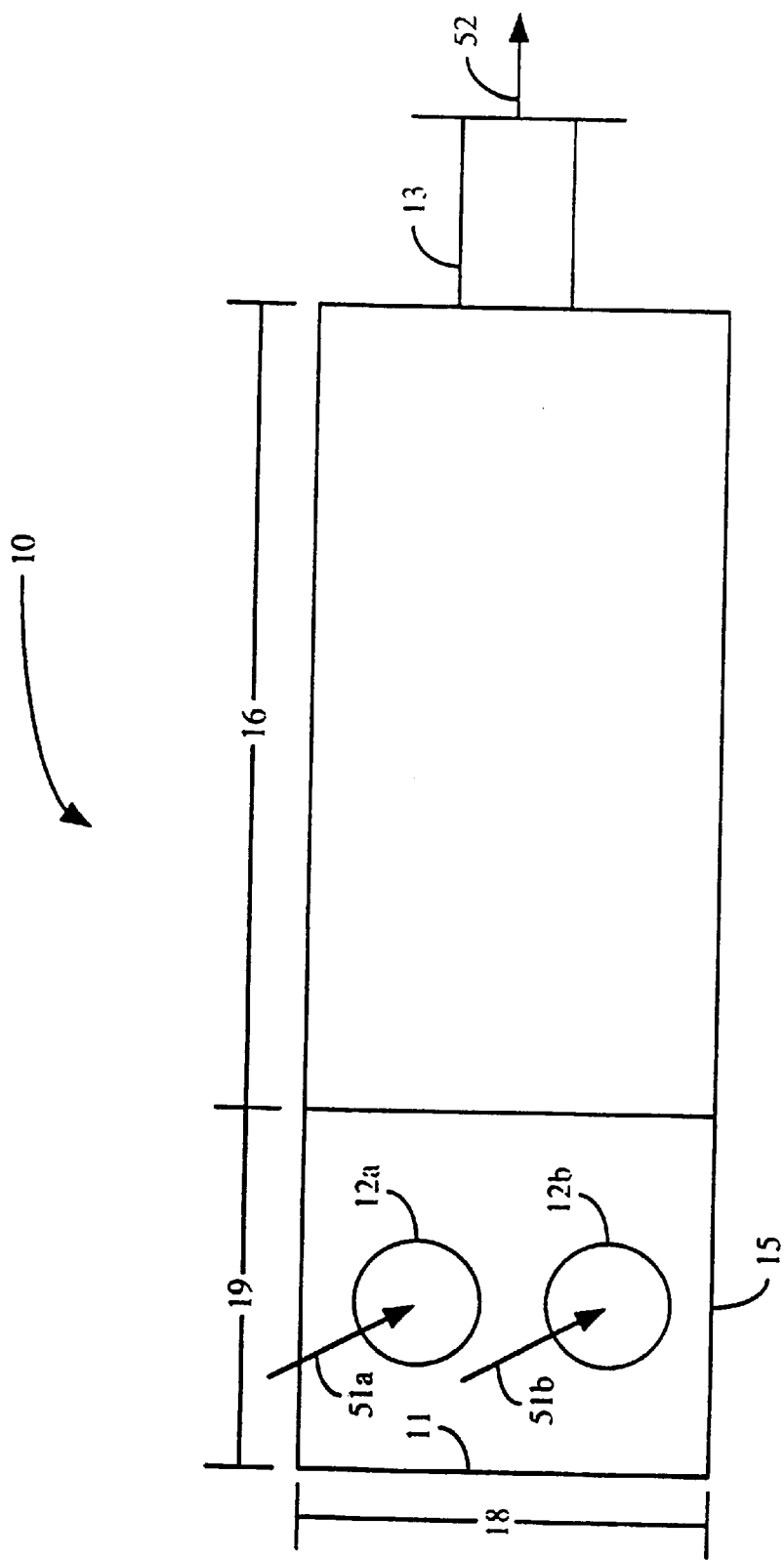
FIG. 2 is a top view of the present invention.

FIG. 2 shows a top view of chamber 10. The width 18 of chamber 10 is in the range of approximately 6–12 inches in the currently preferred embodiment. Segment 15, which contains air inlet 11 and gas inlet 12, has a length 19 extending beyond the length 16 of chamber 10 of approximately 6 inches in the currently preferred embodiment. Segment 15 has a height equal to the height 17 of each tier of chamber 10 and the same width 18 as the remainder of chamber 10. As can be best seen in FIG. 1, air inlet 11 has triangular members 11a which create a venturi-like inlet for incoming air.

It will be appreciated that the above dimensions can be varied within a certain range. The main concern is to maintain a turbulent flow of air and pyrophoric gas throughout a sufficient length of chamber 10 to ensure complete mixing of the air and pyrophoric gas so that all or nearly all of the pyrophoric gas is neutralized. For example, in the currently preferred embodiment, baffles 14 are not utilized because it has been found for the dimensions given above, sufficient turbulence is created by the S-curve construction, together with the turbulence created by air inlet 11. Thus, numerous other configurations are possible provided sufficient turbulence is created and maintained. For example, a plurality of baffles 14 could be added, or the shape of baffles 14 could be modified. For example, a curved baffle or "L" shaped baffle could be used. Additionally, it is possible a 2-tier or single tier chamber could be used so long as there are means such as baffles and an inlet configuration which promotes turbulence. However, an advantage of a multi-tiered chamber, in addition to the turbulence created by the 180° changes in flow direction, is that increased travel time through the chamber is provided for with a reduced footprint. Also, in a multi-tiered configuration such as that currently used, the height of all tiers does not necessarily need to be equal but can be varied somewhat, so long as a turbulent flow, which ensures complete mixing of the gas and air streams to create a controlled reaction between the pyrophoric gas and air, is maintained.

As can be seen from FIG. 2, a plurality of gas inlets 12, shown as inlet 12a and 12b, can be present in chamber 10. Each of gas inlets 12a and 12b could be connected to, for example, a line coupled to the vacuum pump exhaust from a CVD reactor. Inlets 12 thus receive the spent process gas from the CVD reactor. A chamber 10 having dimensions at the low end of the ranges given above can accommodate one gas inlet 12, while a chamber 10 having dimensions at the high end of the ranges given above can accommodate up to three gas inlets 12.

Figure 3:
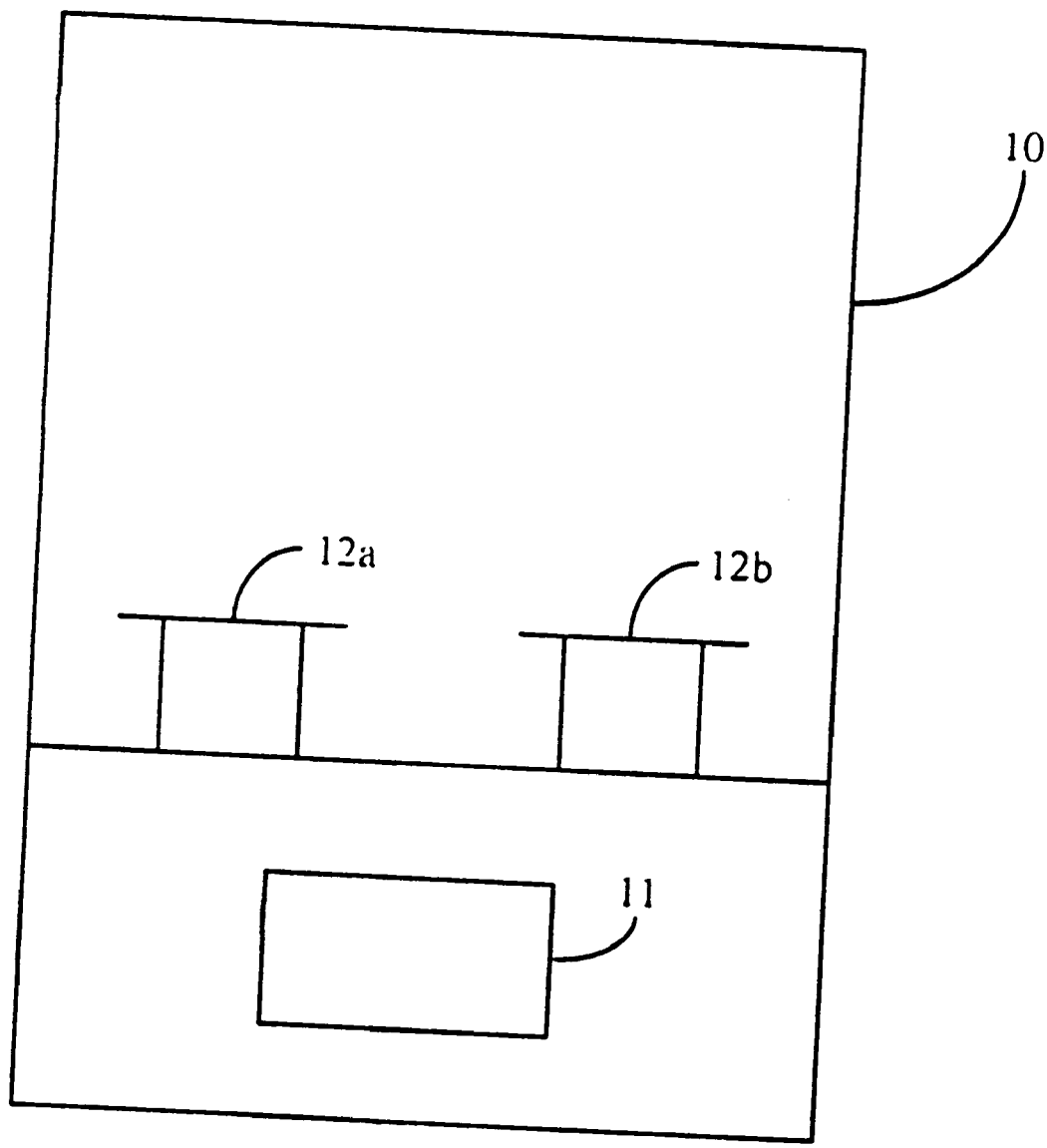
FIG. 3 is an end view of the present invention.

FIG. 3 shows an end view of chamber 10. As can be seen in the figure, air inlet 11 is rectangular in shape. In the currently preferred embodiment, air inlet 11 is approximately 4 inches long by 2.5 inches high.

In the currently preferred embodiment, chamber 10 is constructed of 14 gauge (0.075 inch) 316 stainless steel. Some portions, such as the baffles 14 and stand-offs (not shown) are made of, for example, ¼ inch 316 stainless steel.

The exact dimensions of chamber 10 and amount of air flow through air inlet 11 will depend upon the flow of pyrophoric gas through gas inlets 12. The pyrophoric gas flow is shown by arrow 51 in FIG. 1. In normal operation, each gas inlet 12 is connected to, for example, the pump exhaust from a CVD reactor as described above. A typical CVD exhaust will have some amount of one or more pyrophoric gases, such as, for example, silane, dichlorosilane ($SiH_2Cl_2$), trichlorosilane ($SiHCl_3$), any of the previously mentioned pyrophoric gases, or others. As used in this specification, the term "pyrophoric gas" indicates that one or more pyrophoric gases are present, and use of the term "pyrophoric gas" in the following discussion is not meant to imply that only a single species of pyrophoric gas is present. In addition, one or more flammable gases, such as $H_2$, as well as one or more inert gases, such as $N_2$, may be present. The exact composition of the spent gas stream 51 will depend upon the particular process and equipment.

Typically, the flow of, for example, silane in the spent gas stream 51 will be in the range of approximately 50–1000 cubic centimeters per minute (ccm). However, under worst case conditions, for example, when the process is shut down and by-passed, considerably more silane may be present. Under worst case conditions, for a typical semiconductor manufacturing facility utilizing standard pressurized supply cylinders and piping, the silane flow may be as high as 30,000 ccm or 30 liters per minute (lpm). Thus, the neutralization chamber 10 must be able to neutralize a process gas stream containing anywhere in the range of approximately 50–30,000 ccm of pyrophoric gas safely.

In operating the neutralization chamber 10, a great excess of air is used to ensure turbulent flow. The amount of air necessary to achieve a turbulent flow results in a greater than stoichiometric ratio of oxygen to pyrophoric gas. The proper air flow for a given set of dimensions of chamber 10 has been determined experimentally, as will be described later. For example, it has been determined experimentally for neutralizing silane that for a chamber 10 with a length 16 of 2 feet, width 18 of 6 inches, and 3 tiers each having a height 17 of 4 inches, and a single gas inlet 12, an air flow in the range of approximately 75–100 cubic feet per minute (cfm) is sufficient (1 cfm=28.3 lpm). For an intermediate sized chamber 10 having a length 16 of 2 feet, 8 inches, width 18 of 8 inches and per tier height 17 of 4 inches, and two gas inlets 12, an air flow in the range of approximately 125–150 cfm is sufficient. Finally, for a chamber 10 having a length 16 of 2 feet, 8 inches, width 18 of 1 foot, and per tier height 17 of 6 inches, and three gas inlets 12, an air flow in the range of approximately 175–200 cfm is sufficient. For the preferred configuration described herein, it has been determined experimentally that the minimum air flow should be about 70 times the expected maximum silane flow rate. The maximum air flow rate is determined by the minimum residence time necessary for the pyrophoric gas to react. For silane, it has been determined experimentally that a residence time of at least approximately ½ second is necessary.

In the currently preferred embodiment, exhaust port 13 is connected to an exhaust fan (not shown). In order to regulate the air flow through chamber 10 when the exhaust port 13 of chamber 10 is connected to a fan having a relatively constant air pull, the size of air inlet 11 can be varied. In order to determine the proper size of inlet 11 to achieve the desired air flow rate for a given chamber 10, an inlet 11 covered by a slide mechanism can be utilized to allow for varying the flow rate for experimentation. Alternatively, a fan can be connected to air inlet 11 to push the required air through chamber 10.

In an alternative embodiment, the spent gas stream 51 from more than one piece of equipment can be first combined and then introduced into chamber 10 through a single gas inlet 12. However, this can only be done when there is no possibility that either of the streams contain an oxidant, as an explosion may result. As a further alternative embodiment, an oxidant other than air could be used, for example, oxygen or nitrous oxide ($N_2O$) would work in place of air, but would obviously be much more expensive. Alternatively, an oxidizing species such as $O_2$ or $N_2O$ can be added in addition to air at any point in the flow of chamber 10. Also, greater quantities of pyrophoric gas can be neutralized so long as a turbulent flow and sufficient residence time through chamber 10 is maintained.

In the operation of chamber 10 in neutralizing silane, it has been found that at a silane flow under 600 ccm no flame is generated in chamber 10. At a silane flow of approximately 600 ccm or greater, a flame is generated by the silane neutralization. Silane concentration has been measured at the exhaust port 13 under a variety of conditions. In the cases where a flame is generated, no silane could be detected in the exhaust stream 52 exiting exhaust port 13. At low silane flow rates, for example, 50 ccm silane in 20 lpm nitrogen entering chamber 10 through gas inlet 12 (i.e. 2,500 ppm silane incoming), the average silane concentration measured at exhaust port 13 was in the range of approximately 0–3 ppm and in no case exceeded 6 ppm. At these low concentrations, there is no risk of explosion and silane bubble formation (i.e. silane self protection) does not occur.

It should also be noted that if flammable gases are present in the gas stream 51, the operation of chamber 10 in regard to pyrophoric neutralization will not be hindered. In cases where chamber 10 operates without a flame, the flammable gas will be unaffected. In flame operations, the flammable gas will be largely consumed. As an additional consideration, if gas stream 51 contains a toxic or hazardous component or if the pyrophoric gas in gas stream 51 reacts in chamber 10 to form a toxic by-product, then the toxic component will not necessarily be consumed in chamber 10 and further processing of exhaust stream 52 (e.g. connection to a scrubber) may be necessary to eliminate the toxic component(s).

In determining the optimum configuration of chamber 10, flow rates, inlet 11 shape, and position, number, shape, and location of any baffles 14, a chamber 10 with a glass side panel was constructed. The glass side panel enabled viewing chamber 10 during operation from the same perspective as is shown in FIG. 1. Smoke tests, wherein smoke is added to the air flow, were then conducted to determine a configuration which results in a sufficiently turbulent flow. This method can be used to construct a neutralization chamber with a different shape and/or size as that shown and described above. For example, such testing could be done to construct a chamber for pyrophoric gas flow much greater than 30 lpm per inlet which is the maximum flow at which the embodiments described above were tested. In addition to the glass side panel, a slide over inlet 11, as described earlier, is useful for varying the air flow rates.

Figure 4:
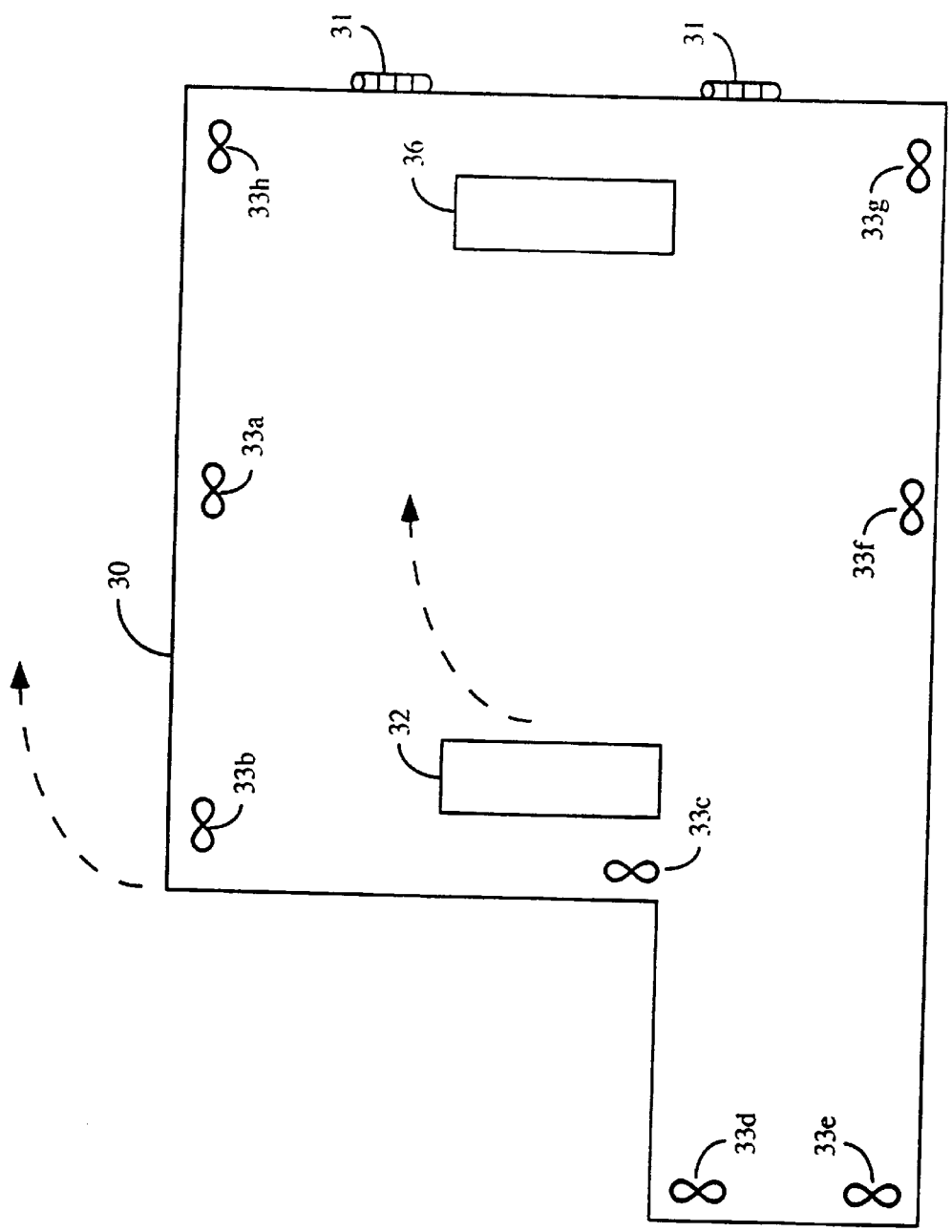
FIG. 4 is a side panel of the present invention.

In the case of silane, one of the reaction products upon neutralization is $SiO_2$. The $SiO_2$ is in the form of a brownish dust or very fine grain sand. In addition, spent process gas stream 51 may contain oil from the CVD reactor's vacuum pump. Because of these residues, the chamber 10 requires occasional cleaning. In order to facilitate cleaning the chamber 10, one or more side panels, such as a panel which would cover the side exposed in FIG. 1, can be made easily removable. Referring to FIG. 4, side panel 30 is attached by hinge members 31, so that it swings out in the direction shown by the arrow. A handle 32 is provided in order to open and shut the side panel. A plurality of wing-nut type screws 33a–33f secures the edges of side panel 30 that are not secured by hinge members 31, to chamber 10 during use. As a further alternative, side panel 30 can be held in place by wing-nuts only. In this case, hinge members 31 are not used and additional wing-nuts 33g and 33h are used. The wing-nuts 33 screw into stand-offs located in chamber 10 (not shown in FIG. 1). When only wing-nuts 33a–33h are used, it is preferable to have an additional handle 36 to facilitate handling of the side panel 30. Alternatively, in place of wing-nuts 33, side panel 30 can be secured by any type of latch-like apparatus that holds the side panel securely in place when latched and that can be quickly and easily un-latched.

Thus, an inactive pyrophoric gas neutralization chamber has been disclosed. The chamber is inexpensive to construct and economical to operate since no fuel source is required. The chamber will neutralize, for example, silane over a wide range of input flows, so that the concentration of silane in the exhaust is either non-detectable or within a range such that the risk of explosion is virtually eliminated.

We claim:

1. A method of reacting a pyrophoric gas comprising the steps of:
   introducing a first flow of a first gas mixture comprising an oxidizing species into a chamber through a first inlet located at a first position;
   introducing a second flow of a second gas mixture comprising said pyrophoric gas into said chamber through a second inlet located at a second position downstream of said first position, wherein said first flow is turbulent from at least a point upstream of said second position; and,
   combining said first and second flows to create a third flow of a third gas mixture comprising said first and said second gas mixtures, said third flow being turbulent from said second position and through at least an additional portion of said chamber, said turbulence causing said first and said second gas mixtures to mix, wherein said turbulence is sufficient to cause said pyrophoric gas to react with said oxidizing species in a controlled manner to be substantially without risk of explosion.

2. The method as described in claim 1 wherein said first gas mixture is air.

3. The method as described in claim 1 wherein said pyrophoric gas is selected from the group consisting of $SiH_4$, $SiH_3Cl$, $SiH_2Cl_2$, $SiHCl_3$, $B_2H_6$, $PH_3$, $AsH_3$, and any mixture thereof.

4. The method as described in claim 2 wherein said pyrophoric gas is selected from the group consisting of $SiH_4$, $SiH_3Cl$, $SiH_2Cl_2$, $SiHCl_3$, $B_2H_6$, $PH_3$, $AsH_3$, and any mixture thereof.

5. The method as described in claim 1 wherein a sufficient amount of said pyrophoric gas reacts with said oxidizing species such that when said third flow exits said chamber said third flow has a substantially reduced risk of explosion.

6. The method as described in claim 4 wherein a sufficient amount of said pyrophoric gas reacts with said oxidizing species such that when said third flow exits said chamber said third flow has a substantially reduced risk of explosion.

7. The method as described in claim 1 wherein said method does not include use of an ignitor device and does not include use of a fuel source in addition to said pyrophoric gas.

8. The method as described in claim 4 wherein said method does not include use of an ignitor device and does not include use of a fuel source in addition to said pyrophoric gas.

9. The method as described in claim 1 wherein a non-zero flow rate of up to 30 liters per minute of said pyrophoric gas flows in said second flow of said second gas mixture.

10. The method as described in claim 4 wherein a non-zero flow rate of up to 30 liters per minute of said pyrophoric gas flows in said second flow of said second gas mixture.

* * * * *

UNITED STATES PATENT AND TRADEMARK OFFICE
CERTIFICATE OF CORRECTION

PATENT NO.    : 6,084,148
DATED         : June 4, 2000
INVENTOR(S)   : Shiban et al.

It is certified that error appears in the above-identified patent and that said Letters Patent is hereby corrected as shown below:

Title page,
Item [57], ABSTRACT,
Line 12, delete "were", insert -- where --.

Column 1,
Line 33, delete "$B_2H_4$", insert -- $B_2H_6$ --.

Column 2,
Line 31, delete "ten", insert -- tens --.

Signed and Sealed this

Twenty-eighth Day of January, 2003

JAMES E. ROGAN
*Director of the United States Patent and Trademark Office*